Figure 1:
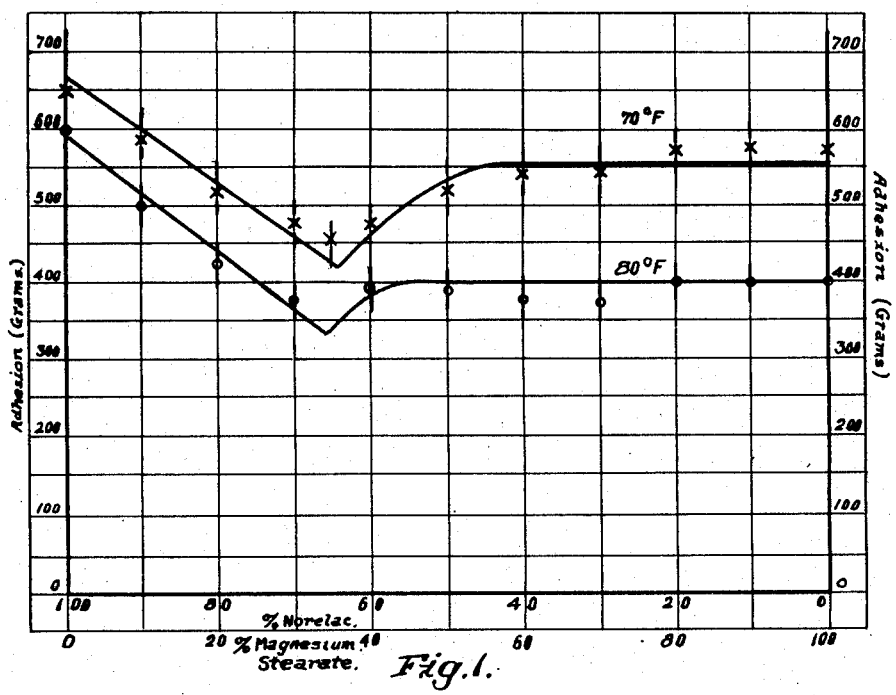

Oct. 11, 1949.   J. B. MARTIN   2,484,416
ADHESIVE TAPE AND COMPOSITION THEREFOR
Filed Nov. 9, 1945

Inventor.
John B. Martin
Rowland V. Patrick
Attorney.

Patented Oct. 11, 1949

2,484,416

UNITED STATES PATENT OFFICE 2,484,416

ADHESIVE TAPE AND COMPOSITION THEREFOR

John B. Martin, Glen Ellyn, Ill., assignor to The Kendall Company, Boston, Mass., a corporation of Massachusetts Application November 9, 1945, Serial No. 627,759

15 Claims. (Cl. 117—68.5)

This invention relates to compositions of matter useful as water-insoluble coating materials for fibrous and non-fibrous materials and is concerned particularly with the preparation of novel flexible water-insoluble coating materials and their application to flexible sheet materials such as cloth, paper and membranaceous films.

It is a primary object of the invention to provide water-insoluble compositions particularly adapted for application to materials in the form of adherent continuous coatings imparting advantageous properties to the materials bearing the coatings.

One important property is the moisture-proofing quality of coatings of this invention, useful for moisture-proofing cellophane or other fibrous or non-fibrous materials.

Another important property is the low degree of adhesion and inertness of coatings of this invention to certain pressure-sensitive adhesives.

Compositions of this invention are particularly useful in pressure-sensitive adhesive tape structures wherein one side of a fibrous non-fibrous or membranaceous flexible sheet material bears an adherent flexible coating of the composition and the opposite side of the sheet bears a pressure-sensitive adhesive coating. In such structures, a remarkable preferential adhesion of certain pressure-sensitive adhesives to the face of the sheet material is secured as compared to their adhesion to the coated back of the sheet material, whereby commercially satisfactory unrollability of rolls of the tape is maintained even over long periods of storage under relatively adverse conditions. Furthermore, the coatings are remarkably inert to such adhesives, and do not deteriorate or otherwise detrimentally affect the adhesives even after prolonged contact therewith.

Other important uses for materials surfaced with coatings of the composition of this invention are as slip and facing elements for adhesive coated products.

Compositions of this invention are water-insoluble but may be solubilized in conventional volatile hydrocarbon solvents at elevated temperature permitting their commercial application to fabrics with relatively inexpensive solvents. They contain as an essential ingredient a material of the type represented by "Norelac," which is described in an article entitled "Norelac—a proposed new synthetic coating material" by Cowan, Lewis and Falkenberg, published in the April 1944 issue of "Oil and Soap," pages 101-107. As described in this article, materials of the Norelac type are polyamides prepared from polymeric fat acids of drying and semi-drying oils, and are specifically reaction products of dimeric and trimeric fat acids or esters with diamino amines, such as the ethylene diamine polyamide of dimeric and trimeric fat acid esters derived from linoleic and linolenic acids. The polymeric fat acids and esters may be prepared from soybean, linseed or other drying and semi-drying vegetable oils.

The Norelac type polyamides are insoluble in conventional hydrocarbon solvents at 25° C., and insoluble or only very slightly soluble at 100° C. For example, the Cowan article above referred to requires that in solvent coating operations, a concentration of alcohol greater than 20%, in the case of butanol, be utilized in the solvent. In accordance with one object of this invention, such ordinarily insoluble Norelac materials are rendered soluble in conventional volatile hydrocarbon solvents by mixing or reacting with the Norelac polyamide a solubilizing agent in the form of a polyvalent metallic salt or amide of a saturated fat acid, such as magnesium, calcium, zinc, tin or aluminum stearates and palmitates, and stearamide, so that the Norelac may be spread in conventional volatile hydrocarbon solvents to form a continuous coating and particularly on materials such as cellulose acetate which would be attacked by alcohol and ketone type organic solvents such as those proposed in the above referred to Cowan et al. article. Materials such as cellulose acetate, nitrocellulose, and polyvinyl acetate are solubilized by ketone and alcohol type solvents. Accordingly, in coating such materials with compositions carried by alcohol and ketone vehicles, non-uniform swelling and distortion of the film out of its own plane occurs, impairing its usefulness.

In accordance with this invention, a Norelac-type polyamide, such as the ethylene diamine polymer, may be mixed with magnesium stearate or other solubilizing agent of the type referred to herein in the proportions of at least one part of magnesium stearate to two parts of Norelac and the resulting mixture will be completely soluble at elevated temperature in ordinary hydrocarbon solvents such as toluene and xylene.

Usually it is preferred to mix the materials in the hydrocarbon solvent at an elevated temperature, for example at 170° F., at which temperature a clear true solution is formed. Upon cooling, high concentrations of materials show a tendency to gel.

A solution of the polyamide-solubilizing agent mixture may then be spread on ordinary solvent-spreading equipment on any desired material to form a continuous thin flexible water-insoluble moisture-proofing coating therefor. The solution may be spread hot and the deposit after solvent evaporation possesses the characteristics of this invention. If spread cold, however, it is preferred to subject the coating after spreading to a fairly hot oven treatment to attain surface temperatures in excess of the melting point of the coating material, i. e. in the case of magnesium stearate, in excess of about 235° F.

For example, in the case of application to cellophane, a hot (170° F. or above) solution in xylene of two parts by weight of Norelac and one part by weight of magnesium stearate may be spread on the back of the cellophane and then passed through an oven at a sheet temperature of approximately 200° F. The solids concentration of the solution may be about 10%. This will produce a smooth continuous thin water-insoluble coating firmly adherent to the cellophane.

Similarly, in the case of a cellulose acetate film, the same hot solution may be spread on a surface of the cellulose acetate and then oven dried at a sheet temperature of about 200° F.

In the case of paper or fibrous material, the spread may be as above described in connection with the cellophane or cellulose acetate, or, in this instance, the mixture may be spread cold on the paper or fabric and subsequently treated in an oven to attain a surface temperature above the melting point of the coating material, i. e., in the case of magnesium stearate—Norelac. in excess of 235° F. When coating porous materials, the solids concentration is desirably increased to 25–30% or higher.

As hereinbefore indicated, a primary use for the composition hereinbefore described is as a face or back coating for flexible sheet materials. As thus used, I have found that the compositions of this invention exhibit a specific low adhesion to all elastomers commonly used in the formulation of pressure-sensitive adhesives.

Prior to the filing of my application Serial No. 543,418, filed July 3, 1944, now Patent No. 2,439,481, granted April 13, 1948, and copending herewith, I had discovered the efficacy of water-insoluble metallic salts and amides of fatty acids in back coating materials in the case of polybutene pressure-sensitive adhesive tapes. That patent application is particularly directed to a fabricated tape structure applying the principles of that discovery. However, as stated in that copending application, the back coatings therein described, containing a repellent such as magnesium stearate, while providing permanently satisfactory repellency to polybutene adhesives, resulting in commercially satisfactory unrollability of rolls of the tape even after prolonged storage periods, do not exhibit the desired repellency in those cases where the pressure-sensitive adhesive contains as a primary elastomer ingredient crude or reclaim rubber, or butadiene-styrene copolymer, due to the coating dissolving in the elastomer, and accordingly, for commercial purposes, the invention described in that application was and is specifically limited to polybutene pressure-sensitive adhesive structures.

I have now discovered that compositions of the present invention, as when coated on the back of a sheet structure in the fabrication of pressure-sensitive adhesive tapes, exhibit a highly satisfactory low adhesion value and inertness towards certain types of pressure-sensitive adhesives regardless of whether the pressure-sensitive adhesive elastomer ingredient is polybutene, or any other of the usual hydrocarbon elastomers, such as butadiene-styrene copolymer, or natural or reclaim rubber.

In accordance with this invention, I have found that the polyamide component of the coating exhibits a protective action upon the metallic salt, protecting it against solution—which occurs in the absence of the polyamide—in pressure-sensitive adhesives containing as primary elastomer ingredients elastomers other than polybutene.

Because of the presence of the protecting polyamide component in the back or repellent coat, wherever it is desired to obtain the maximum low adhesion value and inertness between pressure-sensitive adhesive coat and back coat, I have found that there is only a certain class of elastomer modifiers that can be safely included as ingredients in the formulation of pressure-sensitive adhesives to be used in the fabrication of adhesive tapes manufactured in accordance with this invention. This class of modifiers comprises resins and plasticizers which are not compatible with or solvents for the composition of the coating.

Common pressure-sensitive adhesive formulation involves modification of the elastomer to secure tackiness and pressure-sensitivity by compounding the elastomer with a normally solid resin and usually with a non-volatile liquid plasticizer. The commonest of the normally solid resins is wood rosin and its developed synthetics such as ester gum, hydrogenated glycerol abietate, and such synthetic resins as Beckacite. All of these common resins, however, when present in a pressure-sensitive adhesive which is designed in storage form to contact a Norelac-component-containing coating will attack the coating, due to mutual solubility or other compatibility, and cause with time such an increased adhesion between the pressure-sensitive adhesive coating and the Norelac-containing coating as to render unrolling or separating qualities unsatisfactory.

As distinguished from these ordinary normally solid resin elastomer modifiers, I have found that the hydrocarbon resins may be utilized to form highly satisfactory elastomer modifiers and that adhesives containing the hydrocarbon resin modifiers will not attack Norelac-type polyamide-containing coats in such a manner as to undesirably affect the low degree of adhesion between the pressure-sensitive adhesive and the Norelac-containing coating over prolonged periods of time. This inertness of the adhesive to the coating is possibly due, in some part at least, to the insolubility of Norelac polyamides in hydrocarbons. Useful solid hydrocarbon resin modifiers include such materials as polymerized terpene resins exemplified by the "Piccolyte" resins manufactured by Pennsylvania Industrial Chemical Corporation; coumarone-indene resins, which, although they contain an oxygen atom, are generally, and for the purposes of this application, classified as hydrocarbon resins, being normal hydrocarbon polymers with behavior essentially that of hydrocarbons; styrene and substituted styrene polymers such as those sold under the trade name "Piccolastics" by Pennsylvania Industrial Chemical Corporation and cyclo paraffin or naphthene polymers.

Since common pressure-sensitive adhesive formulation usage prescribes, in addition, utilization of a non-volatile liquid plasticizer, the above teaching with regard to omission of detrimental modifiers demands selection of the liquid plasticizer, when used, from the group of non-volatile liquid plasticizers, which are not solvents for coatings of this invention, for example a hydrocarbon plasticizer such as mineral oil, polybutene in low molecular weights, low molecular coumarone-indene resins, or low molecular weight substituted styrenes, as distinguished from abietates and phenolic plasticizers. Common inert fillers may also be present in the adhesives.

In accordance with the above teachings, substantial commercial use has been made of the compositions of this invention as back coatings for sheet materials such as cellophane and paper where the adhesive is butadiene-styrene copolymer modified with hydrocarbon resins and plasticizers, producing an adhesive which is essentially a hydrocarbon elasto-viscous material.

For example, cellophane coated on one surface, as previously described, with a Norelac-magnesium stearate coating has applied to the other side thereof by a solvent-spreading operation a pressure-sensitive adhesive formulated in accordance with the following formulae:

Example A

| | Parts by weight |
|---|---|
| GR–S–ST (stabilized butadiene-styrene copolymer) | 50 |
| Hydrocarbon resin (R–1 Nevindene) 150° C. M. P. coumarone-indene resin—Neville Co. | 20 |
| Non-volatile liquid hydrocarbon plasticizer (Piccolastic A–25) | 50 |

Example B

| | |
|---|---|
| Pale crepe rubber | 50 |
| Hydrocarbon resin (Piccolyte—M. P. 100° C.) | 40 |

Example C

| | Parts by weight |
|---|---|
| Reclaim rubber (grey inner tube) | 40 |
| Hydrocarbon resin (Piccolyte—M. P. 100° C.) | 9 |
| Liquid plasticizer (Piccolyte—M. P. 10° C.) | 8 |
| Zinc oxide | 10 |

The same adhesives may be applied to kraft paper to produce highly satisfactory unrollable paper pressure-sensitive adhesive tapes.

Equally satisfactory results may be secured on cellophane, cellulose acetate or other backings with the use of a solvent-spread adhesive of the following formula:

Example D

| | Parts by weight |
|---|---|
| Polybutene (Vistanex) molecular weight 80,000 to 120,000 | 300 |
| Normally solid hydrocarbon resin (Piccolyte—M. P. 100° C.) | 240 |
| Non-volatile liquid hydrocarbon plasticizer (mineral oil) | 150 |

Obviously any polybutene adhesives disclosed in my prior copending application Serial No. 543,418 may be successfully used in accordance with this invention provided they contain only elastomer modifiers inert to the coatings. In general, coatings of the composition of this invention secure better scuff resistance, clarity and film properties than any disclosed in my said copending application.

The favorable low adhesion value secured by the use of coatings of the composition of this invention, after contact with the pressure-sensitive adhesives above described, can be accounted for, in the case of elastomers other than polybutene, only on the ground that the Norelac provides strong protection against the interaction of crude and reclaim rubber and butadiene-styrene copolymer elastomers with the metallic salt; and my investigations point to the existence, in a mixture of Norelac and a polyvalent metallic salt of a fatty acid, of favorable conditions for the formation of hydrogen bond linkages between the molecules of these substances which could be and may very well be of the order of strength of weak compound formation. Such a fixation of the metal soap can explain why the soap does not dissolve in the elastomer or otherwise cause detrimental increased adhesion value to develop between the composition and a crude rubber type of pressure-sensitive adhesive during prolonged contact, which dissolution and increased adhesion value does develop in the absence of the protective Norelac component.

Furthermore, physico-chemical investigations indicate that a theory of such compound formation is not without scientific support. These investigations include adhesion and thermal analyses of compositions having various proportions of polyvalent metallic salt to Norelac content in comparative tests with Norelac alone and the metallic salt alone.

The results of adhesion analyses, in the case of magnesium stearate, are shown in the graph of Fig. 1 wherein relative adhesion between a pressure-sensitive adhesive composition and a surface coated with a composition of this invention in varying proportions is plotted. These adhesion tests were conducted as follows: Coatings of varying magnesium stearate to Norelac content proportions were applied to surfaces of steel plates from hot solution. The coatings were heated above the melting point of the composition, i. e. 350° F. Cellophane pressure-sensitive adhesive tapes were prepared having identical coatings of pressure-sensitive adhesives formulated in accordance with Example D. After the adhesive tapes had been prepared they were cut into strips and one one-inch wide strip of each type was applied to a coated surface of a steel plate. The plates were then placed at an 11° inclined position and a seven pound roller free to move vertically was passed over the strip and plate at the rate of one foot per minute up and back to adhere the pressure-sensitive surface to the Norelac-stearate surface. One end of each one-inch strip was then attached to the clamp of a tensile strength Scott tester and the one-inch strip was separated from the coated surface at an approximately 180° angle at the rate of one foot per minute and the average pull in grams was plotted. One series of tests was conducted under temperature conditions of 70° F. and another series at temperatures of 80° F.

The results are shown in the curves.

In the case of a 100% Norelac coating, the average adhesion value at 80° F. was about 600 grams while, in the case of 100% magnesium stearate coating, the average adhesion value was 400 grams. As the proportion of stearate increased from 0 to 30% by weight of the coating, the average adhesion values dropped at both temperatures as a substantial linear function of the proportion of stearate until the coatings having about a 30% stearate content reached a minimum average adhesion value lower than the adhesion value of a coating of magnesium stearate alone.

With the proportion of stearate increased to 40% by weight of the coating the adhesion values remained in the same low range. With further increase in magnesium stearate, the adhesion values increased somewhat. After the magnesium stearate exceeded 60% content, the adhesion values approximately equalled, and remained at, the value for magnesium stearate alone.

In accordance with the teachings of this invention therefore, to attain maximum low adhesion values the metallic salt to Norelac content by weight should be about two parts of Norelac to one of metallic salt and should be within the range of from about four parts of Norelac to about one of metallic salt to from about two parts of Norelac to about three parts of metallic salt, i. e. about 25–150% metallic salt, based upon the weight of the Norelac. Expressed in terms of the total coating weight, this range corresponds to about 80–40% Norelac and about 20–60% metallic salt.

Figure 2:
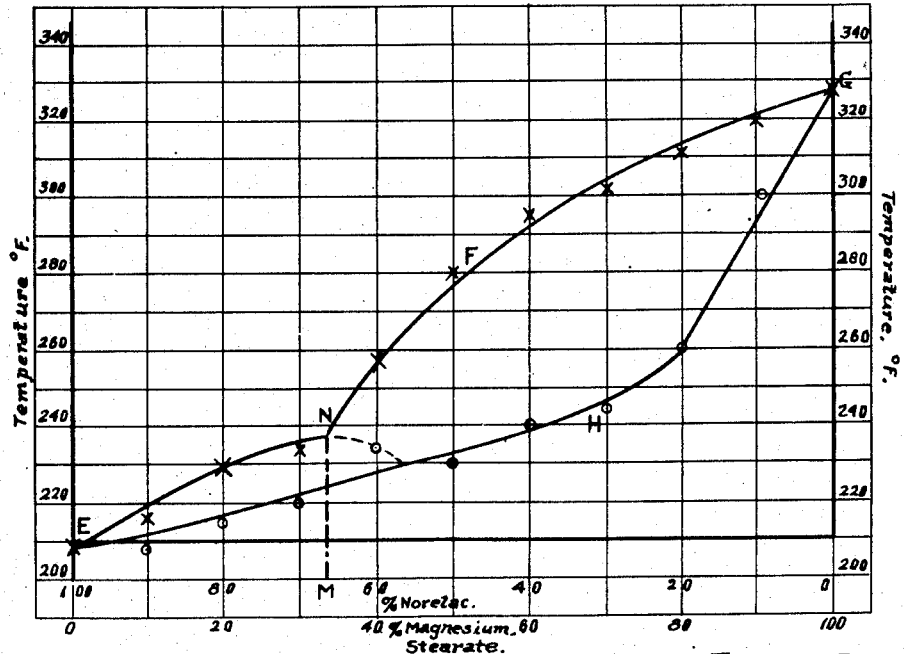

Fig. 2 represents the results of an investigation carried out in accordance with metallographic technique having for an object the observation of the uniformity in rate of temperature reduction of mixtures of varying proportions of Norelac and magnesium stearate when slowly cooled from a temperature exceeding the melting point of both substances.

This test was carried out by cooling varying proportions of Norelac and magnesium stearate from a temperature of 350° F. with constant stirring and noting any variation in the rate of cooling until the temperature was reduced below that of the melting point of the Norelac, that is below 210° F.

The points plotted in the graph of Fig. 2 represent, in the case of each ratio, an observed definite time interval of reduction in rate of cooling. In the case of each proportion, such a rate reduction was observed at one relatively higher temperature and again at a second relatively lower temperature.

As shown in the graph, magnesium stearate has a melting point of about 324° F. whereas the Norelac has a melting point of about 210° F. Compounds at temperatures falling in the area above the curve ENG were entirely liquid.

Upon reaching the respective temperatures lying on the curve ENG, some phase conversion apparently took place resulting in a momentary liberation of heat retarding the rate of temperature decline with the result that in the area represented between the curves ENG and the curve EHG, some portion of the stearate had apparently converted to solid form. Upon reaching temperatures represented by points lying along the curve EHG a further retardation in the rate of cooling was observed indicating a further phase conversion to solid form.

The form of the curve ENG is typical of compound reaction thermal analysis curves, the point represented by a 33.8% stearate and 66.2% Norelac content lying along the ordinate MN indicating an approximate composition of the compound formed by the two components.

It has also been found that when the components of the compound are in the proportions corresponding to the ordinate MN the compound is completely soluble at elevated temperature in conventional volatile hydrocarbon solvents and all compounds having proportions lying to the right of ordinate MN are fully soluble at elevated temperature in such hydrocarbon solvents while those lying to the left of the ordinate MN show cloudiness and partial insolubility even at elevated temperature, down to complete insolubility where the stearate content is zero.

The fact that the adhesion value curves in Fig. 1 indicate a minimum low point of adhesion, when taken in connection with thermal analysis graphs as illustrated in Fig. 2, strongly supports probable compound formation at the proportion of about two parts of Norelac to one part of stearate. In accordance with my theory of the invention there is probably a linkage of the order of weak compound formation through the amide hydrogen of the Norelac to the oxygen atom in the stearate acid radical.

In any event, regardless of whether or not there is an actual bond linkage, it will be seen from the above that the Norelac component acts in a novel manner to protect the metallic salt from being dissolved in or otherwise deteriorating elastomers and permits the attainment of the desired low adhesion values in all cases where the pressure-sensitive adhesives are formulated with an eye to omitting any efficient solvent for the Norelac or for the metallic salt.

Compositions of the present invention thus provide, when applied in conventional volatile hydrocarbon solvents to sheet or other materials, including cellophane, cellulose acetate, cloth, metal foils, paper or other unwoven webs, continuous thin water-insoluble coats repellent to pressure-sensitive adhesives applied either to opposite surfaces of the material or to other surfaces. The repellency is not dependent upon the particular nature of the elastomer of the adhesive, as in the case of magnesium stearate alone. This invention therefore to my knowledge provides for the first time, in the case of elastomers other than polybutene, a commercially satisfactory water-insoluble repellent coat, i. e. one which will permit prolonged storage in roll form without destroying unrollability, and in the case of polybutene elastomers may provide a water-insoluble repellent coating of increased repellency over any described in my prior copending application Serial No. 543,418 previously referred to. As previously described, the attainment of such a universally satisfactory water-insoluble repellent coat is, in part at least, founded upon the following discoveries:

(1) Compositions resulting from the mixing of a Norelac type polyamide with polyvalent metallic salts of fatty acids or with fatty acid amides, as distinguished from the salts and amides by themselves, exhibit characteristics of repellency, that is low adhesion value and inertness, to all usual pressure-sensitive adhesive elastomers and are not attacked by such elastomers in such manner as to increase adhesion therebetween beyond the point of unrollability in tape form even over prolonged periods of storage in contact therewith.

(2) There are available modifiers for formulating satisfactory pressure-sensitive adhesives utilizing such elastomers, which modifiers likewise are stable and inactive towards compositions resulting from mixing Norelac-type polyamide and polyvalent metallic salts and amides of fatty acids, even upon prolonged contact therewith during storage, although many conventional elastomer modifiers heretofore commonly used in pressure-sensitive adhesive formulation are not suitable.

In addition, Norelac modified coatings of this invention have moisture-proof qualities providing moisture vapor resistance which is enhanced by the inclusion of the metallic salt.

The coatings, whether utilized as adhesive tape back coatings or otherwise, may contain limited quantities of pigments and/or dyes to provide colored coats. In use as coatings for facing sheets or slip sheets, adhesive tapes may be applied to the coated surfaces and are easily removable therefrom and, upon removal, the adhesives will not show deterioration from their contact with the coating material.

For the purposes of this application, the term "Norelac-type polyamide" is used to connote a polyamide of a dibasic acid polymer, such as residual dimeric and trimeric fat acids or esters derived from linoleic and linolenic acids present in semi-drying and drying oils (called "polymeric fat acids"), and a diamino-amine such as methylene, ethylene or propylene diamine and represented by the type of material described in "Oil and Soap," April 1944, pages 101–107, and its equivalents.

I claim:

1. As a new composition of matter, a mixture consisting essentially of a polyamide of the type formed by the reaction of polymeric fat acids of the drying and semi-drying oils with a diamino-amine, with 25–150%, based upon the weight of the polyamide, of a substance selected from the group consisting of polyvalent metallic salts of fatty acids and monoamides of fatty acids.

2. As a new composition of matter, a mixture consisting essentially of a polyamide of the type formed by the reaction of polymeric fat acids of the drying and semi-drying oils with a diamino-amine, with about 50%, based upon the weight of the polyamide, of a substance selected from the group consisting of polyvalent metallic salts of fatty acids and monoamides of fatty acids, said product being soluble at 170° F. in conventional volatile hydrocarbon solvents.

3. As a new composition of matter, a mixture consisting essentially of polyamide of the type formed by the reaction of polymeric fat acids of the drying and semi-drying oils with a diamino-amine, and about 50%, based upon the weight of the polyamide, of a substance selected from the group consisting of polyvalent metallic salts of fatty acids and monoamides of fatty acids, dispersed in a conventional volatile hydrocarbon solvent, said composition being a clear solution at 170° F.

4. As a new composition of matter, a mixture consisting essentially of a polyamide, of the type formed by the reaction of polymeric fat acids of the drying and semi-drying oils with a diamino-amine, with a polyvalent metallic salt of a fatty acid.

5. As a new composition of matter, a mixture consisting essentially of a polyamide of the type formed by the reaction of polymeric fat acids of the drying and semi-drying oils with a diamino-amine, with magnesium stearate.

6. The method of rendering a polyamide of the type formed by the reaction of polymeric fat acids of the drying and semi-drying oils with a diamino-amine and which is soluble in oxygenated organic solvents but insoluble in conventional volatile hydrocarbon solvents, soluble at elevated temperature in such hydrocarbon solvents, which comprises mixing with the reacted diamino-amine-polymeric-fat-acid-polyamide a substance selected from the group consisting of polyvalent metallic salts of fatty acids and monoamides of fatty acids.

7. A method as claimed in claim 6, wherein said substance is magnesium stearate.

8. A pressure-sensitive adhesive tape comprising a flexible sheet backing bearing on one side thereof a coating of the composition claimed in claim 1 and on its opposite side a pressure-sensitive adhesive coating consisting essentially of a hydrocarbon elasto-viscous material constituted of an elastomer selected from the group consisting of rubber, polybutene and butadiene-styrene copolymer.

9. A pressure-sensitive adhesive tape comprising a flexible sheet backing bearing on one side thereof a coating of the composition claimed in claim 5 and on its opposite side a pressure-sensitive adhesive coating comprising an elastomer selected from the group consisting of rubber, polybutene and butadiene-styrene copolymer.

10. A pressure-sensitive adhesive tape comprising a sheet backing material bearing on one side thereof a coating comprising the product resulting from mixing an ethylene diamine polymer of a polymeric fat acid of the drying and semi-drying oils with 25–150% based upon the weight of the polymer of a polyvalent metallic salt of a fatty acid and bearing on its opposite side a pressure-sensitive adhesive consisting essentially of a hydrocarbon elasto-viscous material constituted of an elastomer selected from the group consisting of rubber, polybutene and butadient-styrene copolymer.

11. A pressure-sensitive adhesive tape comprising a sheet backing material bearing on one side thereof a coating comprising the product resulting from mixing an ethylene diamine polymer of a polymeric fat acid of the drying and semi-drying oils and 25–150% of magnesium stearate based upon the weight of the polymer, and bearing on its opposite side a pressure-sensitive adhesive comprising an elastomer selected from the group consisting of rubber, polybutene and butadiene-styrene copolymer.

12. A pressure-sensitive adhesive tape comprising a sheet backing material bearing on one side thereof a coating comprising the product resulting from mixing an ethylene diamine polymer of a polymeric fat acid of the drying and semi-drying oils and 25–150% of magnesium stearate based upon the weight of the polymer, and bearing on its opposite side a pressure-sensitive adhesive consisting essentially of a hydrocarbon elastomer selected from the group consisting of rubber, polybutene and butadiene-styrene copolymer, a normally solid hydrocarbon resin and a non-volatile liquid hydrocarbon plasticizer.

13. A pressure-sensitive adhesive tape comprising a backing material bearing on one side thereof a coating of a mixture of a polyamide of the type formed by the reaction of polymeric fat acids of the drying and semi-drying oils with a diamino-amine with 25–150% of magnesium stearate based upon the weight of the polyamide and bearing on its opposite side a pressure-sensitive adhesive containing a natural rubber elastomer.

14. A pressure-sensitive adhesive tape comprising a backing material bearing on one side thereof a coating of a mixture of a polyamide of the type formed by the reaction of polymeric fat acids of the drying and semi-drying oils with a diamino-amine with 25–150% of magnesium stearate based upon the weight of the polyamide and bearing on its opposite side a pressure-sensitive adhesive containing a butadiene-styrene copolymer elastomer.

15. A pressure-sensitive adhesive tape comprising a backing material bearing on one side thereof a coating of a mixture of a polyamide of the type formed by the reaction of polymeric fat acids of the drying and semi-drying oils with a diamino-amine with 25–150% of magnesium stearate based upon the weight of the polyamide and bearing on its opposite side a pressure-sensitive adhesive containing a polybutene elastomer.

JOHN B. MARTIN.

REFERENCES CITED

The following references are of record in the file of this patent:

UNITED STATES PATENTS

| Number | Name | Date |
|---|---|---|
| 2,253,922 | Van Cleef | Aug. 26, 1941 |
| 2,320,645 | Nill | June 1, 1943 |
| 2,334,585 | Schieman | Nov. 16, 1943 |
| 2,379,413 | Bradley | July 3, 1945 |

OTHER REFERENCES

Cowan et al., "Oil and Soap," April 1944, pages 101–107.

Hovey, "Modern Plastics," May 1945, pages 125, 126, 192.

Falkenburg et al., "Oil and Soap," June 1945, pages 143–148.